(12) United States Patent
Ehrlich et al.

(10) Patent No.: US 7,457,066 B2
(45) Date of Patent: Nov. 25, 2008

(54) METHOD AND APPARATUS FOR PHASE-SHIFT NULL-BURST-PATTERN

(75) Inventors: Richard M. Ehrlich, Saratoga, CA (US); Anton Gerasimov, Santa Clara, CA (US)

(73) Assignee: Kabushiki Kiasha Toshiba, Tokyo (JP)

( * ) Notice: Subject to any disclaimer, the term of this patent is extended or adjusted under 35 U.S.C. 154(b) by 120 days.

(21) Appl. No.: 11/421,430

(22) Filed: May 31, 2006

(65) Prior Publication Data
US 2007/0279786 A1 Dec. 6, 2007

(51) Int. Cl.
*G11B 5/09* (2006.01)
*G11B 20/14* (2006.01)

(52) U.S. Cl. .......................................... 360/48; 360/40
(58) Field of Classification Search ........................ None
See application file for complete search history.

(56) References Cited

U.S. PATENT DOCUMENTS

| | | | |
|---|---|---|---|
| 4,549,232 A | 10/1985 | Axmear |
| 4,614,986 A | 9/1986 | La Budde |
| 4,706,250 A | 11/1987 | Patell et al. |
| 4,811,124 A | 3/1989 | Dujari et al. |
| 4,829,249 A | 5/1989 | Matsushita |
| 4,833,679 A | 5/1989 | Anderson et al. |
| 4,881,136 A | 11/1989 | Shiraishi et al. |
| 4,993,029 A | 2/1991 | Galbraith et al. |
| 5,068,858 A | 11/1991 | Blaum et al. |
| 5,109,304 A | 4/1992 | Pederson |
| 5,150,050 A | 9/1992 | Genheimer et al. |
| 5,267,241 A | 11/1993 | Kowal |
| 5,339,204 A | 8/1994 | James et al. |
| 5,424,638 A | 6/1995 | Huber |
| 5,444,719 A | 8/1995 | Cox et al. |
| 5,455,536 A | 10/1995 | Kono et al. |
| 5,487,077 A | 1/1996 | Hassner et al. |

(Continued)

FOREIGN PATENT DOCUMENTS

EP 769774 4/1997

(Continued)

OTHER PUBLICATIONS

Al Mamun, A., et al., "Efficient position encoding in hard disk drive using dual frequency servo bursts", *The 27th Annual Conference of the IEEE Industrial Electronics Society, 2001*. IECON '01. vol. 1, (2001),609-614.

(Continued)

*Primary Examiner*—Joseph Feild
*Assistant Examiner*—Jason Olson
(74) *Attorney, Agent, or Firm*—Schwegman Lundberg & Woessner, P.A.

(57) ABSTRACT

A media includes a plurality of tracks, a preamble portion including a set of signals, a first servo burst having a first plurality of signals written substantially in phase with the preamble portion, and a second servo burst written out of phase with the preamble and the first servo portion. The media may be housed within a disk drive that includes a transuding head to read information from the media, and a read channel to read information from the disk including the information associated with the first servo burst and the second servo burst.

8 Claims, 9 Drawing Sheets

U.S. PATENT DOCUMENTS

| | | | |
|---|---|---|---|
| 5,532,586 | A | 7/1996 | Ishikawa |
| 5,563,746 | A | 10/1996 | Bliss |
| 5,568,331 | A | 10/1996 | Akagi et al. |
| 5,615,064 | A | 3/1997 | Blank et al. |
| 5,659,436 | A | 8/1997 | Chainer et al. |
| 5,663,846 | A | 9/1997 | Masuoka et al. |
| 5,751,947 | A | 5/1998 | Arakawa |
| 5,781,363 | A | 7/1998 | Rowan et al. |
| 5,792,947 | A | 8/1998 | Pogrebinsky et al. |
| 5,815,338 | A | 9/1998 | Tsunekawa et al. |
| 5,867,341 | A | 2/1999 | Volz et al. |
| 6,057,926 | A | 5/2000 | Horai |
| 6,081,112 | A | 6/2000 | Carobolante et al. |
| 6,091,564 | A | 7/2000 | Codilian et al. |
| 6,101,227 | A | 8/2000 | Glover |
| 6,175,459 | B1 | 1/2001 | Tomita |
| 6,195,220 | B1 | 2/2001 | Ellis et al. |
| 6,198,584 | B1 | 3/2001 | Codilian et al. |
| 6,204,629 | B1 | 3/2001 | Rote et al. |
| 6,204,989 | B1 | 3/2001 | Hrinya et al. |
| 6,219,814 | B1 | 4/2001 | Coker et al. |
| 6,243,224 | B1 | 6/2001 | Sacks et al. |
| 6,259,576 | B1 | 7/2001 | Ahn |
| 6,292,316 | B1 | 9/2001 | Dietzel et al. |
| 6,292,913 | B1 | 9/2001 | Son |
| 6,363,214 | B1 | 3/2002 | Merello et al. |
| 6,411,459 | B1 | 6/2002 | Belser et al. |
| 6,429,995 | B1 | 8/2002 | Dobbek et al. |
| 6,469,849 | B1 | 10/2002 | Ellis et al. |
| 6,490,111 | B1 | 12/2002 | Sacks |
| 6,519,107 | B1 | 2/2003 | Ehrlich et al. |
| 6,522,488 | B2 | 2/2003 | Sasamoto et al. |
| 6,608,477 | B2 | 8/2003 | Sacks et al. |
| 6,631,046 | B2 | 10/2003 | Szita et al. |
| 6,643,082 | B1 | 11/2003 | Belser |
| 6,651,213 | B2 | 11/2003 | Hassner et al. |
| 6,704,156 | B1 | 3/2004 | Baker et al. |
| 6,760,179 | B2 | 7/2004 | Moon et al. |
| 6,760,184 | B1 | 7/2004 | Cunningham |
| 6,785,075 | B2 | 8/2004 | Bryant et al. |
| 6,785,084 | B2 | 8/2004 | Szita |
| 6,885,514 | B1 | 4/2005 | Codilian et al. |
| 6,906,884 | B2 | 6/2005 | Yasuna |
| 6,940,679 | B1 | 9/2005 | McNeil et al. |
| 6,943,977 | B2 | 9/2005 | Yatsu |
| 6,961,203 | B1 | 11/2005 | Baker |
| 7,023,631 | B2 | 4/2006 | Zhang et al. |
| 7,333,290 | B1 * | 2/2008 | Kupferman ............ 360/77.08 |
| 2001/0019463 | A1 | 9/2001 | Drouin |
| 2002/0141101 | A1 | 10/2002 | Brittner et al. |
| 2003/0065469 | A1 | 4/2003 | Pedrazzini et al. |
| 2003/0161065 | A1 | 8/2003 | Yatsu |
| 2003/0179482 | A1 | 9/2003 | Fukushima |
| 2003/0189781 | A1 | 10/2003 | Dunn |
| 2003/0214747 | A1 | 11/2003 | Baral |
| 2004/0061968 | A1 | 4/2004 | Fukushima et al. |
| 2004/0075935 | A1 | 4/2004 | Yatsu |
| 2004/0114270 | A1 | 6/2004 | Chung et al. |
| 2004/0123025 | A1 | 6/2004 | Chainer et al. |
| 2004/0145825 | A1 | 7/2004 | Miles |
| 2004/0201914 | A1 | 10/2004 | Ikeda et al. |
| 2004/0252394 | A1 * | 12/2004 | Hamaguchi et al. .......... 360/48 |
| 2004/0264019 | A1 | 12/2004 | Curtiss et al. |
| 2004/0264031 | A1 | 12/2004 | Yatsu |
| 2005/0013037 | A1 | 1/2005 | Tanner |
| 2005/0052767 | A1 | 3/2005 | Miyata |
| 2005/0073770 | A1 | 4/2005 | Ehrlich et al. |
| 2005/0078403 | A1 | 4/2005 | Mizukoshi |
| 2005/0082996 | A1 | 4/2005 | Luebbe |
| 2005/0099720 | A1 | 5/2005 | Chung |
| 2005/0117240 | A1 | 6/2005 | Codilian et al. |
| 2005/0117245 | A1 | 6/2005 | Park et al. |
| 2005/0152058 | A1 | 7/2005 | Schmidt |
| 2005/0174679 | A1 | 8/2005 | Chan et al. |
| 2005/0207051 | A1 | 9/2005 | Fukushima |
| 2005/0218853 | A1 | 10/2005 | Kokami |
| 2005/0237646 | A1 | 10/2005 | Ehrlich |
| 2005/0237653 | A1 | 10/2005 | Ehrlich |
| 2005/0237656 | A1 | 10/2005 | Ehrlich |
| 2005/0237658 | A1 | 10/2005 | Ehrlich |
| 2005/0237659 | A1 | 10/2005 | Ehrlich |
| 2005/0248872 | A1 | 11/2005 | Ehrlich |
| 2005/0254160 | A1 | 11/2005 | Bandic |
| 2006/0132962 | A1 * | 6/2006 | Ehrlich et al. ............ 360/75 |

FOREIGN PATENT DOCUMENTS

| | | |
|---|---|---|
| EP | 962915 | 12/1999 |
| GB | 2361576 | 10/2001 |
| JP | 62188015 | 8/1987 |
| JP | 63211116 | 9/1988 |
| JP | 3214474 | 9/1991 |
| JP | 2001014816 | 1/2001 |
| JP | 2002288956 | 10/2002 |
| JP | 2005352536 | 12/2002 |
| JP | 2003-008590 | 1/2003 |
| JP | 2003085904 | 3/2003 |
| JP | 2005174429 | 6/2005 |
| JP | 2005190509 | 7/2005 |
| WO | WO-9741558 | 11/1997 |

OTHER PUBLICATIONS

Al Mamun, A., et al., "Measurement of position offset in hard disk drive using dual frequency servo bursts", *IEEE Transactions on Instrumentation and Measurement*, 52(6), (2003),1870-1880.

Gurumurthi, Sudhanva, et al., "DRPM: Dynamic Speed Control for Power Management in Server Class Disks", *Proceedings of the 30th Annual International Symposium on Computer Architecture*, (2003),169-181.

Hughes, E C., et al., "Characterization of three servo patterns for position error signal generation in hard drives", *Proceedings of the 2003 American Control Conference*, (Jun. 2003),4317-4322.

Matsuoka, Kaoru, "Servo track writing of HDDs using magnetic printing technology", *JSME News*, 16(1), The Japan Society of Mechanical Engineers,(2005),1-10.

Sacks, Alexei, "Positive error signal generation in magnetic disk drives", (*Presentation*)—*PhD Thesis of Alexei Sacks, Carnegie-Mellon University*, (1995),1-37.

Schultz, M D., et al., "A self-servowrite clocking process", *IEEE Transactions on Magnetics*, 37(4), (Jul. 2001),1878-1880.

Sereinig, W., "Motion control: the power side of disk drives", *Proceedings of the International Conference on Computer Design: VLSI in Computers & Processors*, (2001),1-6.

Takaishi, K., et al., "Hard disk drive servo technology for media-level servo track writing", *IEEE Transactions on Magnetics*, 39(2), (Mar. 2003),851-856.

Ye, Haibei, et al., "Radial error propagation issues in self-servo track writing technology", *IEEE Transactions on Magnetics*, 38(5), (Sep. 2002),2180-2182.

* cited by examiner

METHOD AND APPARATUS FOR PHASE-SHIFT NULL-BURST-PATTERN

TECHNICAL FIELD

A disk drive is an information storage device. A disk drive includes one or more disks clamped to a rotating spindle, and at least one head for reading information representing data from and/or writing data to the surfaces of each disk. More specifically, storing data includes writing information representing data to portions of tracks on a disk. Data retrieval includes reading the information representing data from the portion of the track on which the information representing data was stored. Disk drives also include an actuator utilizing linear or rotary motion for positioning transducing head(s) over selected data tracks on the disk(s). A rotary actuator couples a slider, on which a transducing head is attached or integrally formed, to a pivot point that allows the transducing head to sweep across a surface of a rotating disk. The rotary actuator is driven by a voice coil motor.

Disk drive information storage devices employ a control system for controlling the position the transducing head during read operations, write operations and seeks. The control system includes a servo control system or servo loop. The function of the head positioning servo control system within the disk drive information storage device is two-fold: first, to position the read/write transducing head over a data track with sufficient accuracy to enable reading and writing of that track without error; and, second, to position the write element with sufficient accuracy not to encroach upon adjacent tracks to prevent data erosion from those tracks during writing operations to the track being followed.

A servo control system includes a written pattern on the surface of a disk called a servo pattern. The servo pattern is read by the transducing head. Reading the servo pattern results in positioning data or a servo signal used to determine the position of the transducing head with respect to a track on the disk. In one servo scheme, positioning data can be included in servo wedges, each including servo patterns. Information included in the servo patterns can be used to generate a position error signal (PES) that indicates the deviation of the transducing head from a desired track center. The PES is also used as feedback in the control system to provide a signal to the voice coil motor of the actuator to either maintain the position of the transducing head over a desired track centerline or to reposition the transducing head to a position over the centerline of a desired track.

A preamble signal is generally written ahead of a servo pattern. The preamble generally is written at a certain frequency. A phase lock loop circuit locks onto the frequency associated with the preamble so that subsequent signals can be written with a known phase relationship with the preamble. For example, servo patterns, that include several different servo bursts, are generally written so that they have a phase relationship with the preamble signal. The fact that the servo pattern is written in phase with the preamble provides needed information for the disk drive, and specifically the read channel, to properly decode the servo information and provide an accurate reading of the position of the read head or read transducer with respect to the center of the track.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

The description set out herein illustrates the various embodiments of the invention and such description is not intended to be construed as limiting in any manner.

DETAILED DESCRIPTION

Figure 1:
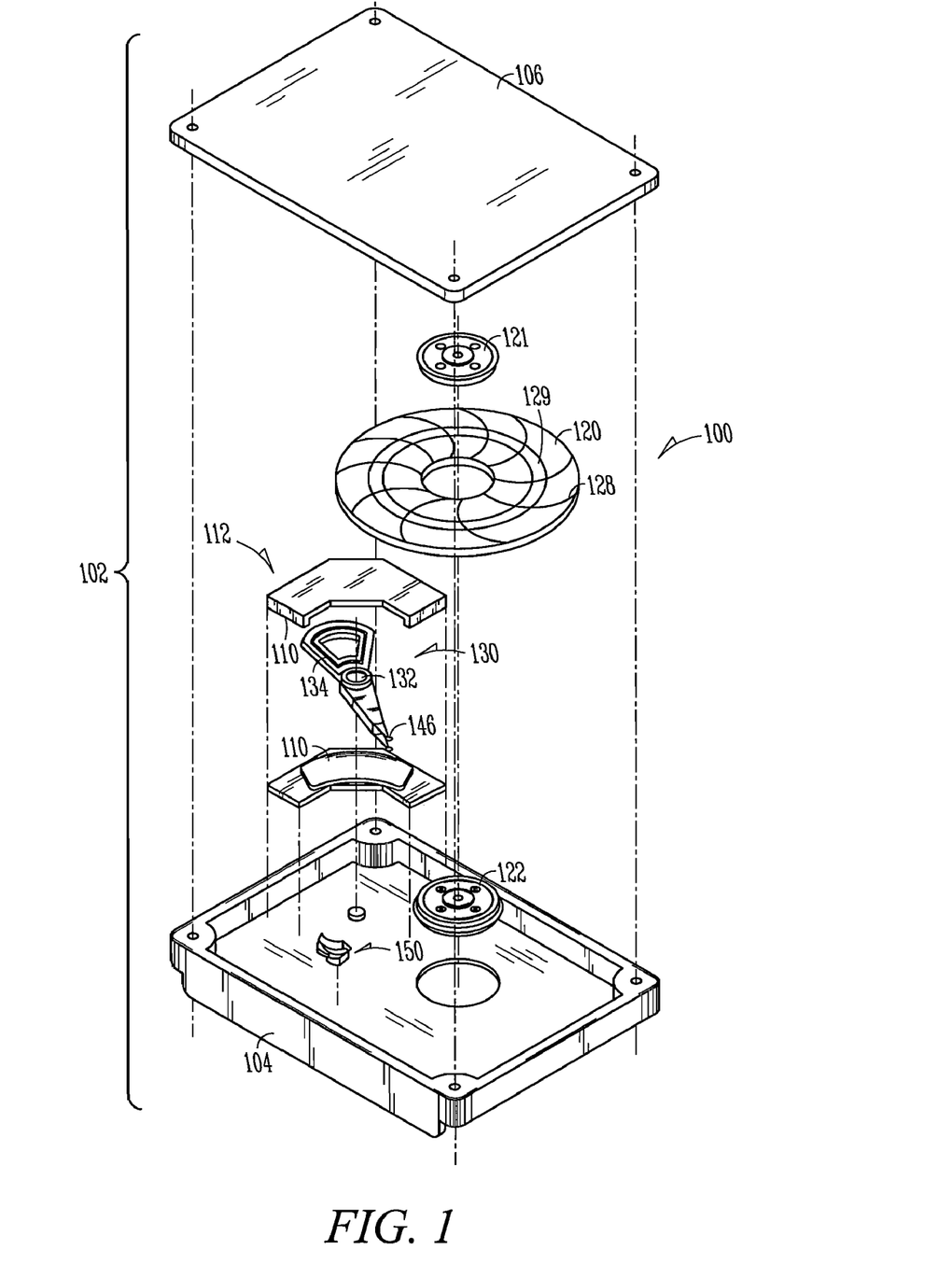
FIG. 1 is an exploded view of a disk drive that uses example embodiments described herein.

FIG. 1 is an exploded view of disk drive 100 that uses various embodiments of the present invention. The disk drive 100 includes a housing 102 including a housing base 104 and a housing cover 106. The housing base 104 illustrated is a base casting, but in other embodiments a housing base 104 can comprise separate components assembled prior to, or during assembly of the disk drive 100. A disk 120 is attached to a hub or spindle 122 that is rotated by a spindle motor. The disk 120 can be attached to the hub or spindle 122 by a clamp 121. The disk may be rotated at a constant or varying rate ranging from less than 3,600 to more than 15,000 revolutions per minute. Higher rotational speeds are contemplated in the future. The spindle motor is connected with the housing base 104. The disk 120 can be made of a light aluminum alloy, ceramic/glass or other suitable substrate, with magnetizable material deposited on one or both sides of the disk. The magnetic layer includes small domains of magnetization for storing data transferred through a transducing head 146. The transducing head 146 includes a magnetic transducer adapted to read data from and write data to the disk 120. In other embodiments, the transducing head 146 includes a separate read element and write element. For example, the separate read element can be a magneto-resistive head, also known as a MR head. It will be understood that multiple head 146 configurations can be used.

A rotary actuator 130 is pivotally mounted to the housing base 104 by a bearing 132 and sweeps an arc between an inner diameter (ID) of the disk 120 and a ramp 150 positioned near an outer diameter (OD) of the disk 120. Attached to the housing 104 are upper and lower magnet return plates 110 and at least one magnet that together form the stationary portion of a voice coil motor (VCM) 112. A voice coil 134 is mounted to the rotary actuator 130 and positioned in an air gap of the VCM 112. The rotary actuator 130 pivots about the bearing 132 when current is passed through the voice coil 134 and pivots in an opposite direction when the current is reversed, allowing for control of the position of the actuator 130 and the attached transducing head 146 with respect to the disk 120. The VCM 112 is coupled with a servo system (shown in FIG. 4) that uses positioning data read by the transducing head 146 from the disk 120 to determine the position of the head 146 over one of a plurality of tracks on the disk 120. The servo system determines an appropriate current to drive through the voice coil 134, and drives the current through the voice coil 134 using a current driver and associated circuitry (not shown in FIG. 1).

Each side of a disk 120 can have an associated head 146, and the heads 146 are collectively coupled to the rotary actuator 130 such that the heads 146 pivot in unison. The invention described herein is equally applicable to devices wherein the individual heads separately move some small distance relative to the actuator. This technology is referred to as dual-stage actuation (DSA).

One type of servo system is an embedded servo system in which tracks on each disk surface used to store information representing data contain small segments of servo information. The servo information, in some embodiments, is stored in radial servo sectors or servo wedges shown as several narrow, somewhat curved spokes 128 substantially equally spaced around the circumference of the disk 120. It should be noted that in actuality there may be many more servo wedges than as shown in FIG. 1. The servo wedges 128 are further detailed in FIGS. 2 and 7 and in the discussions associated with those FIGs.

The disk 120 also includes a plurality of tracks on each disk surface. The plurality of tracks is depicted by two tracks, such as track 129 on the surface of the disk 120. The servo wedges 128 traverse the plurality of tracks, such as track 129, on the disk 120. The plurality of tracks, in some embodiments, may be arranged as a set of substantially concentric circles. Data is stored in fixed sectors along a track between the embedded servo wedges 128. The tracks on the disk 120 each include a plurality of data sectors. More specifically, a data sector is a portion of a track having a fixed block length and a fixed data storage capacity (e.g. 512 bytes of user data per data sector). The tracks toward the inside of the disk 120 are not as long as the tracks toward the periphery of the disk 110. As a result, the tracks toward the inside of the disk 120 can not hold as many data sectors as the tracks toward the periphery of the disk 120. Tracks that are capable of holding the same number of data sectors are grouped into a data zones. Since the density and data rates vary from data zone to data zone, the servo wedges 128 may interrupt and split up at least some of the data sectors. The servo sectors 128 are typically recorded with a servo writing apparatus at the factory (called a servo-writer), but may be written (or partially written) with the disk drive's 100 transducing head 146 in a self-servowriting operation.

Figure 2:
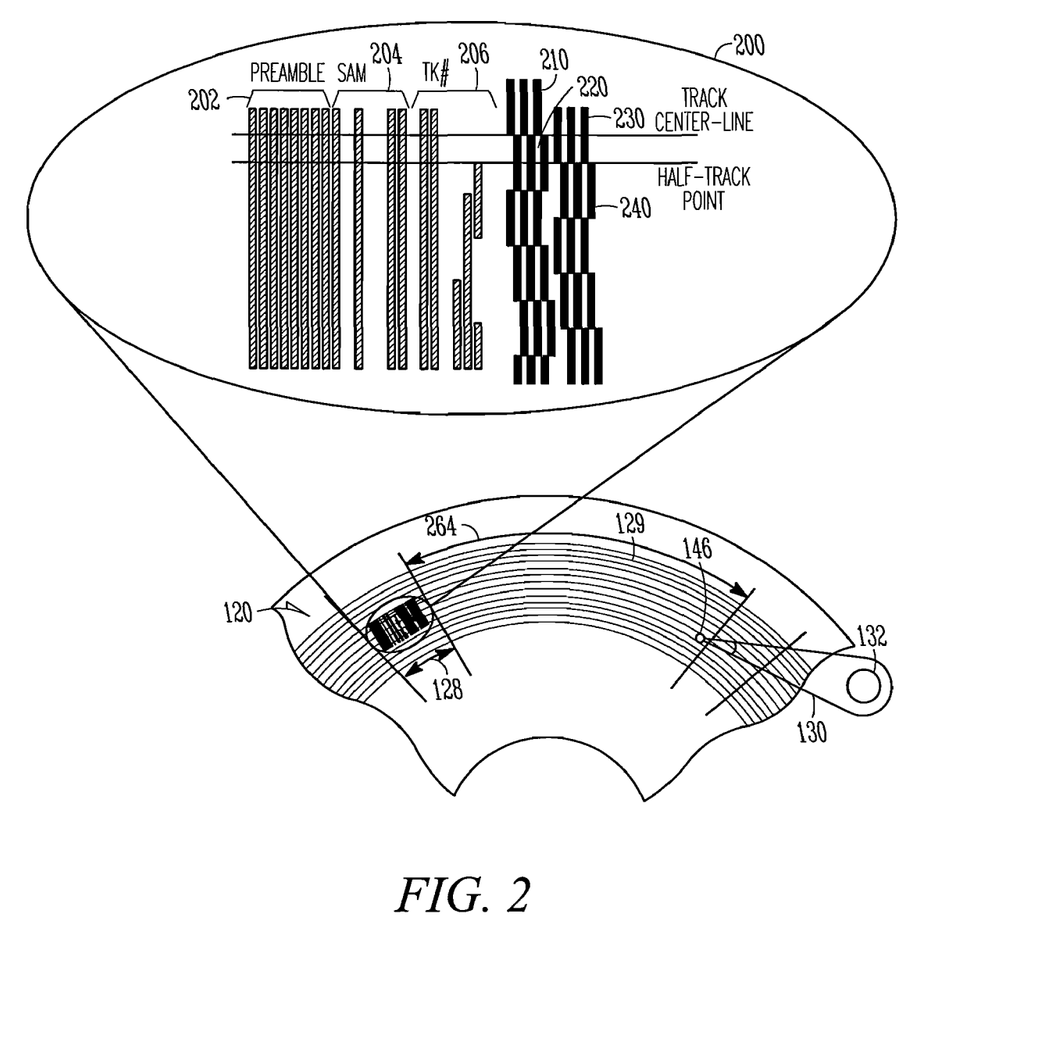
FIG. 2 is a partial detailed view of a disk from the disk drive shown in FIG. 1 that includes a first servo pattern, according to an example embodiment.

FIG. 2 shows a portion of a disk 120 having at least one servo wedge 128. Each servo wedge 128 includes information stored as regions of magnetization or other indicia, such as optical indicia. A servo wedge 128 can be longitudinally magnetized (for example, in the magnified portion of FIG. 2 a servo pattern 200 includes cross-hatched blocks magnetized to the left and white spaces magnetized to the right, or vice-versa) or alternatively perpendicularly magnetized (e.g., the cross-hatched blocks are magnetized up and the white spaces are magnetized down, or vice-versa). Servo patterns 200 contained in each servo wedge 128 are read by the transducing head 146 as the surface of the spinning disk 120 passes under the transducing head 146. The servo patterns 200 can include information identifying a data sector contained in a data field 264. For example, the servo pattern 200 can include digital information such as a preamble 202, a servo address mark (SAM) 204, a track identification number 206. The servo pattern 200 may also include a first phase burst servo pattern 210 and a second phase burst servo pattern 220 that can be used to generate a position error signal (PES) to correct deviations of the transducing head 146 with respect to the center of a track 129.

In some embodiments, the servo wedge 120 will also include other information such as a wedge number. This can be a single bit to designate an index wedge (wedge #0), or the SAM may be replaced by another pattern (referred to as a servo index mark or SIM), or the wedge may contain a few low-order bits of the wedge number or a complete wedge number.

The magnified portion of FIG. 2 illustrates one example servo pattern 200. The servo pattern shown is a null-burst pattern. The null-burst servo pattern 200 includes an A burst 210, a B burst 220, a C burst 230 and a D burst 240. The phase of the A burst is 180 degrees out of phase with the B burst. The A burst and the B burst are adjacent one another, and the border between them is on the centerline of a track. The phase of the C burst is 180 degrees out of phase with the D burst. The C burst and the D burst are adjacent one another and the border between them is on the edge of a track. When a read head is passing over the center of a track, the A burst and the B burst will be null or zero because the adjacent servo patterns will cancel. When the read head is off center, the signal will have a varying amplitude and phase. The phase can be detected through a demodulation scheme. The amplitude can be detected through peak detection. The amplitude can also be determined using a demodulation scheme. Given the phase and the amplitude, the location of the read head from the center track of the disk can be determined. Similarly, the same demodulation can be done with respect to the C burst and the D burst. The C burst and the D burst information can be used as further information regarding the position of the read head with respect to the center of the track or with respect to the border between a first track and a second track. The information from the C burst and the D burst can be used to confirm the position of the read head or may, in some instances, provide information necessary to determine if the read head is on one side (above in FIG. 2) or on the other side (below in FIG. 2) the centerline of the track. The magnified portion of FIG. 2 illustrates one example null pattern having an A burst 210, a B burst 220, a C burst 230, and a D burst 240 written in phase relationship with respect to the preamble 202. It should be noted that in FIG. 2, the signals forming the A burst 210, the B burst 220, the C burst 230, and the D burst 240 written in phase relationship with respect to the preamble 202 are shown in a simplified manner for the sake of illustration.

The disk drive 100 not only includes many mechanical features and a disk with a servo pattern thereon, but also includes various electronics for reading signals from the disk 120 and writing information representing data to the disk 120.

Figure 3:
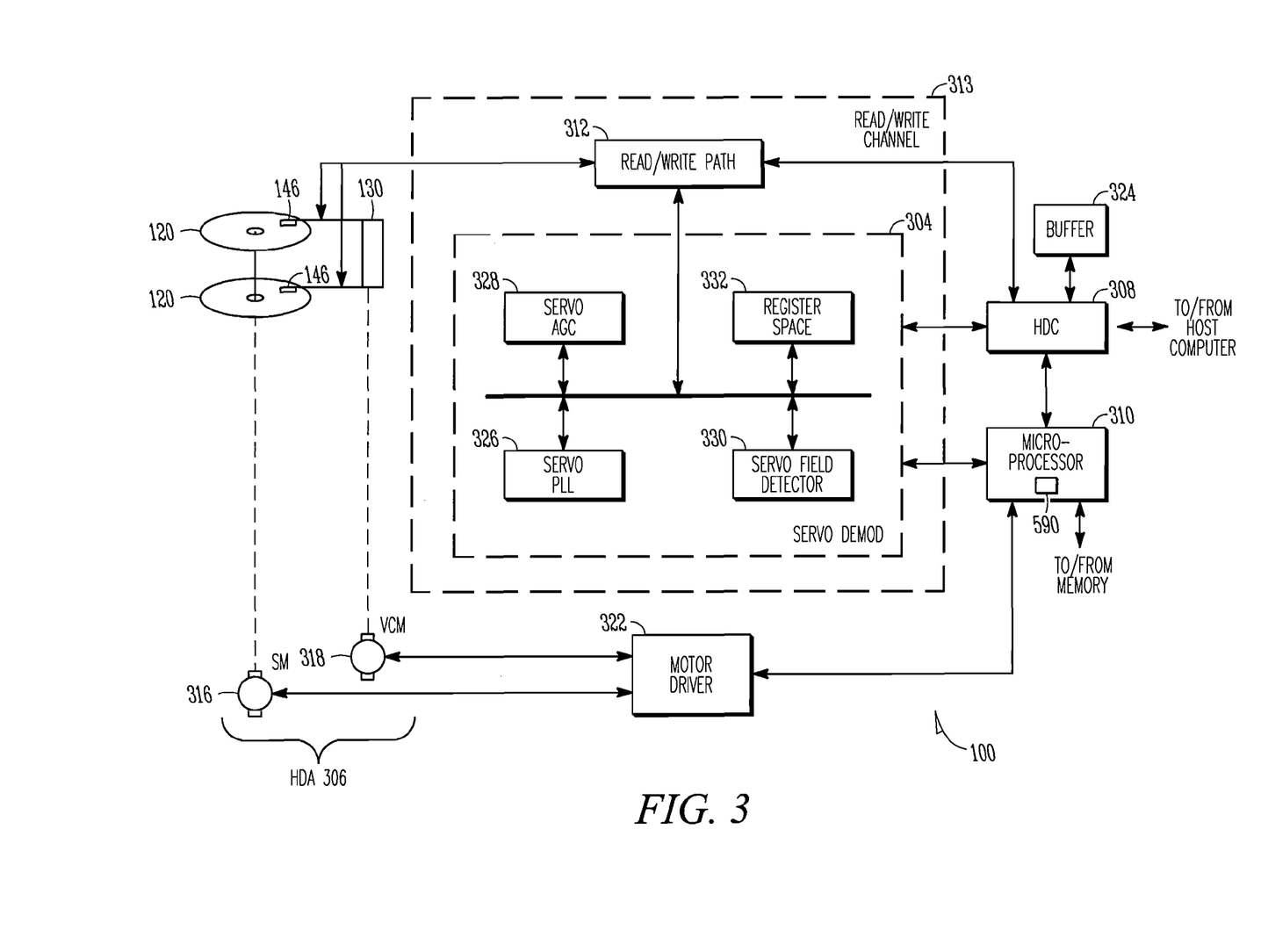
FIG. 3 is a schematic diagram of a disk drive and includes various electrical portions of the disk drive, according to an example embodiment.

FIG. 3 is a schematic diagram of a disk drive 100 that more fully details some of example electronic portions of the disk drive 100, according to an example embodiment. Referring to FIG. 3, the disk drive device 302 is shown as including a head disk assembly (HDA) 306, a hard disk controller (HDC) 308, a read/write channel 313, a microprocessor 310, a motor driver 322 and a buffer 324. The read/write channel 313 is shown as including a read/write path 312 and a servo demodulator 304. The read/write path 312, which can be used to read and write user data and servo data, may include front end circuitry useful for servo demodulation. The read/write path 312 may also be used for writing servo information in self-servowriting. It should be noted that the disk drive 100 also includes other components, which are not shown because they are not necessary to explain the example embodiments.

The HDA 306 includes one or more disks 120 upon which data and servo information can be written to, or read from, by transducers or transducing heads 146. The voice coil motor (VCM) 112 moves an actuator 130 to position the transducing heads 146 on the disks 110. The motor driver 322 drives the VCM 112 and the spindle motor (SM) 316. More specifically, the microprocessor 310, using the motor driver 322, controls the VCM 112 and the actuator 130 to accurately position the heads 146 over the tracks (described with reference to FIGS. 1-3) so that reliable reading and writing of data can be achieved. The servo fields 128, discussed above in the description of FIGS. 1-2, and further detailed below, are used for servo control to keep the heads 146 on track and to assist with identifying proper locations on the disks 120 where data is written to or read from. When reading a servo wedge 128, the transducing heads 146 act as sensors that detect the position information in the servo wedges 128, to provide feedback for proper positioning of the transducing heads 146.

The servo demodulator 304 is shown as including a servo phase locked loop (PLL) 326, a servo automatic gain control (AGC) 328, a servo field detector 330 and register space 332. The servo PLL 326, in general, is a control loop that is used to provide frequency and phase control for the one or more timing or clock circuits (not shown in FIG. 3), within the servo demodulator 304. For example, the servo PLL 326 can provide timing signals to the read/write path 312. The servo AGC 328, which includes (or drives) a variable gain amplifier, is used to keep the output of the read/write path 312 at a substantially constant level when servo wedges 128 on one of the disks 120 are being read. The servo field detector 330 is used to detect and/or demodulate the various subfields of the servo wedges 128, including the SAM 204, the track number 206, the first phase servo burst 210, and the second phase servo burst 220. The microprocessor 310 is used to perform various servo demodulation functions (e.g., decisions, comparisons, characterization and the like), and can be thought of as being part of the servo demodulator 304. In the alternative, the servo demodulator 304 can have its own microprocessor.

One or more registers (e.g., in register space 332) can be used to store appropriate servo AGC values (e.g., gain values, filter coefficients, filter accumulation paths, etc.) for when the read/write path 312 is reading servo data, and one or more registers can be used to store appropriate values (e.g., gain values, filter coefficients, filter accumulation paths, etc.) for when the read/write path 312 is reading user data. A control signal can be used to select the appropriate registers according to the current mode of the read/write path 312. The servo AGC value(s) that are stored can be dynamically updated. For example, the stored servo AGC value(s) for use when the read/write path 312 is reading servo data can be updated each time an additional servo wedge 128 is read. In this manner, the servo AGC value(s) determined for a most recently read servo wedge 128 can be the starting servo AGC value(s) when the next servo wedge 128 is read.

The read/write path 312 includes the electronic circuits used in the process of writing and reading information to and from disks 120. The microprocessor 310 can perform servo control algorithms, and thus, may be referred to as a servo controller. Alternatively, a separate microprocessor or digital signal processor (not shown) can perform servo control functions.

Figure 4:
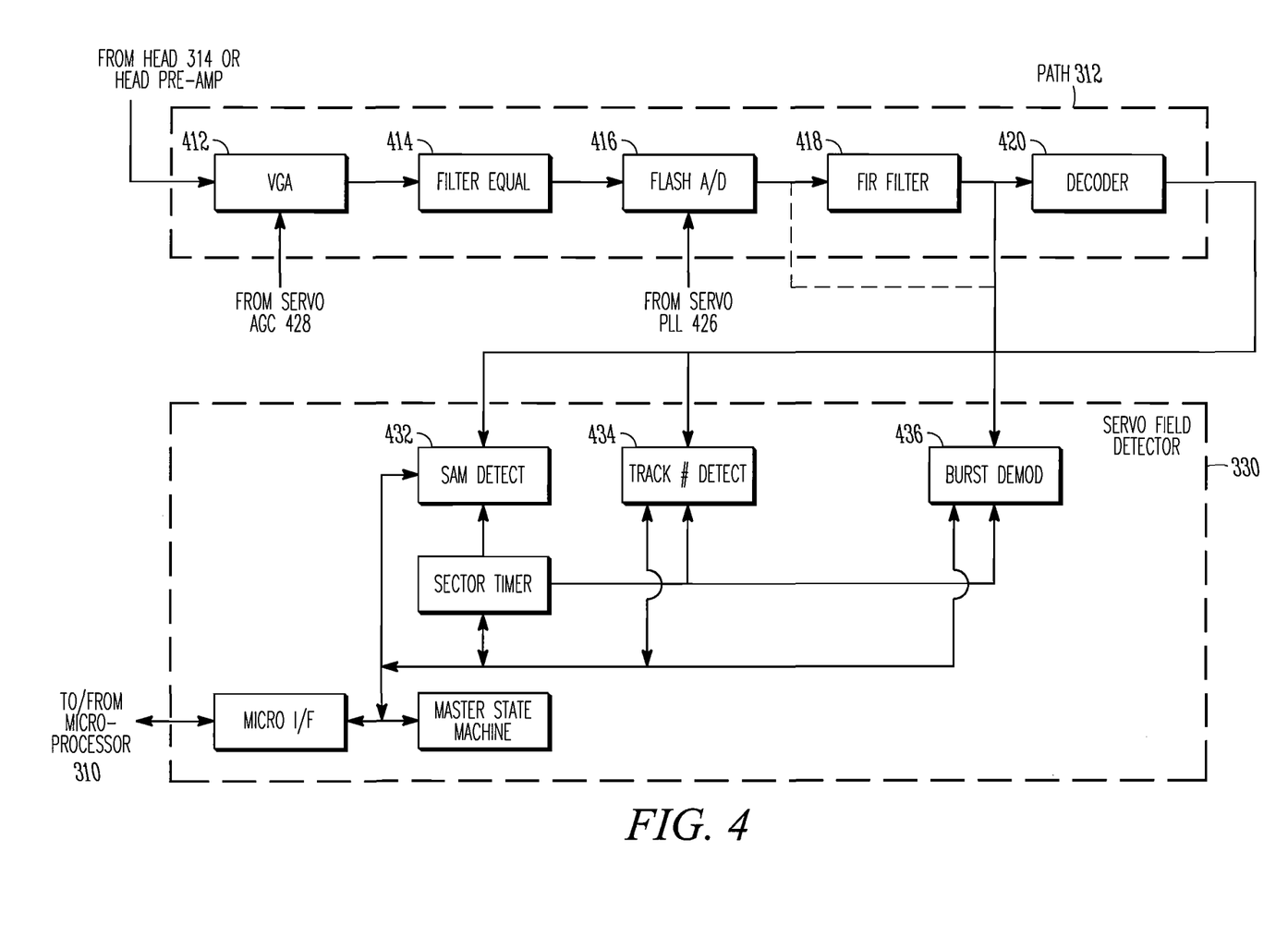
FIG. 4 is a schematic diagram showing portions of the read/write path and a servo field detector of FIG. 3, according to an example embodiment.

FIG. 4 is a schematic diagram showing portions of the read/write path 312 and the servo field detector 330 of FIG. 3, according to an example embodiment. Since the example embodiments relate to reading the servo bursts and processing the signals resulting from reading the servo bursts, the read portions of the read/write path 312 will now be further detailed. The read portion of path 312 is shown as including a variable gain amplifier (VGA) 412, which receives signals from transducing heads 146, or more likely from a pre-amplifier (not shown) driven by a signal received from transducing heads 146. In some embodiments, the VGA 412 may be external to the read/write path 312. During servo reading, the VGA 412 is at least partially controlled by the servo AGC 328. Additional amplifiers, such as buffer amplifiers and/or one or more additional VGAs may also be present. The read/write path 312 is also shown as including an analog filter/equalizer 414, a flash analog-to-digital (A/D) converter 416, a finite impulse response (FIR) filter 418 and a decoder 420. Alternatively, the FIR filter 418 can be upstream of the A/D converter 416, and FIR filtering can be performed using analog circuitry.

During servo reading, magnetic flux transitions sensed by the selected transducing head 146 are may be preamplified before being provided to the VGA 412, which controls amplification of an analog signal stream. The amplified analog signal stream is then provided to the analog filter/equalizer 414, which can be programmed to be optimized for the data transfer rate of the servo information being read by one of heads 146. The equalized analog signal is then subjected to sampling and quantization by the high speed flash A/D 416 which generates raw digital samples that are provided to the FIR filter 418. Timing for sampling can be provided by the servo PLL 326, as shown. Alternatively, sampling maybe performed asynchronously, e.g., using an asynchronous clock (in which case, most features of the present invention are still useful). The FIR filter 418 filters and conditions the raw digital samples before passing filtered digital samples to the decoder 420. The decoder 420 decodes the digital sample stream and outputs a binary signal. The servo PLL 326 can also provide other timing signals that are necessary for the path 312 and portions of the servo demodulator 304 to operate properly.

The binary signal output is provided to the servo field detector 330, and more specifically to a SAM detector 432 and a track number detector 434 of the servo field detector 330. The output of the FIR filter 418 is provided to a burst demodulator 436. Alternatively, the output of the flash A/D 416 can be provided to the burst demodulator 436. The SAM detector 432 searches for a SAM using, for example, pattern recognition logic that recognizes the SAM pattern within the binary stream. The SAM detector 432 can allow some fault or error tolerance, so that a SAM pattern will be detected even if one or more of the bits in the binary stream do not exactly match the SAM pattern. As a consequence, should minor errors occur in reading or writing the SAM patterns, it may still be possible to fully demodulate the information contained in the servo wedge 138. The track number detector 434 performs decoding of gray codes (if necessary) and detects track numbers. The burst demodulator 436 measures burst amplitudes and/or phases.

The read channel 313 reads the first servo burst 210 and the second servo burst 220. The servo signals, as read by the transducing head 146, are less than perfect sine waves. The signal stream of sine waves are sent through the VGA 412 and the analog filter/equalizer 414, which is programmed to be optimized for the data transfer rate of the servo information. The signal stream of sine waves are sampled at a selected frequency which corresponds to a sampling time, T. In the example embodiment, the servo signals are sampled at a rate of four samples per sine wave cycle. In the read channel, the flash analog-to-digital (A/D) converter 416 is used to sample the servo signals as read by the transducing head 146 (FIGS. 1 and 2). The flash analog-to-digital (A/D) converter 416 is capable of sampling millions of samples per second. Each servo burst contains multiple cycles. As shown in FIG. 2, the first servo pattern 210 includes three cycles and the second servo burst contains three cycles. Therefore, sampling the first burst 210 yields 12 numbers. Similarly, sampling the second burst 220 yields another 12 numbers. These samples are then sent to the FIR filter 418 which filters and conditions the raw digital samples before passing filtered digital samples to the decoder 420 and to the servo burst detector 436.

A Discrete Fourier series Transform (DFT) is done on the resultant sample series from the transducing head 146 passing over the A burst 210, the B burst 220, the C burst 230, and the D burst 240. The end result of the DFT on the resultant sample series includes a real part and an imaginary part. The real part and the imaginary part of the DFT can be used to characterize of the samples in terms of amplitude and phase shift. The real and imaginary parts are combined to determine the amplitude of the signal by squaring both the imaginary part and the real part, summing the two, and then taking the square root of the sum. The phase or angle of the first of A burst 210 can be determined by computing an arc tangent of the ratio of the real and imaginary parts. Determining the phase shift between the A burst 210 and the B burst 220 can be accomplished by determining the difference between the angle associated with the A burst 210 and the angle associated with the B burst 220. Given the phase shift between the A burst 210 and the B burst 220 and the specific track number 206 (see FIG. 2), the position of the transducing head 146 on the specific track can be determined. If the read head or transducing head is over the centerline of the track, the signals cancel since they are 180 degrees out of phase with one another. If the position of the transducing head 146 or read head is not on the center of the desired track, the microprocessor 310 delivers a signal to the motor driver 322 which passes current through the VCM 318 to bring the transducing head over the track center. The signal is related to a position error signal which indicates the distance of the transducing head 146 is from the centerline the track. A similar calculation is done using the C burst 230 and the D burst.

In the example embodiment, the sampling rate is four samples per sine wave cycle. According to Nyquist theory, one can reject up to the Nyquist frequency of the signal by doing a DFT on a set of signal samples. The Nyquist frequency is half of the sampling rate. In the example embodiment, the Nyquist frequency is two since the sample rate per sine wave cycle is four. As a result, given a sample rate of four samples per sine wave cycle, the first harmonic can be demodulated and the second harmonic can be rejected.

Figure 5:
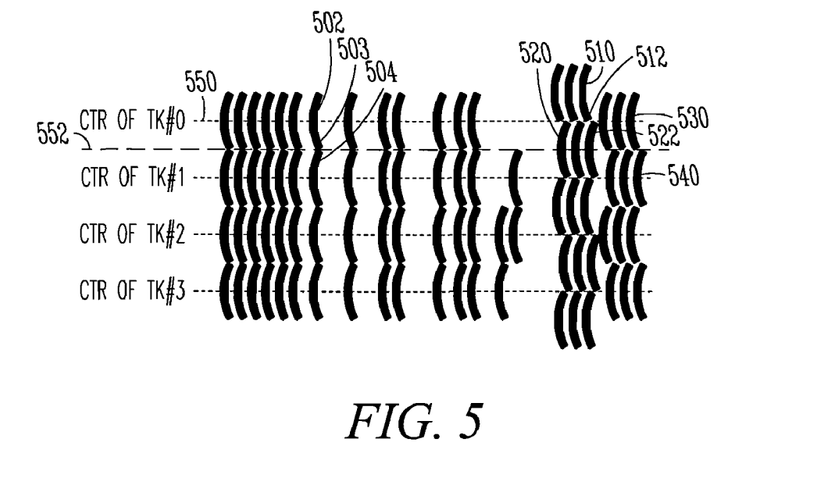
FIG. 5 is a representation of a set of signals that include the preamble, gray code wedge number, and the A burst, the B burst, the C burst, and the D burst as the signals are actually appear on a disk after being written to the disk, in an example embodiment.

FIG. 5 is a representation of a set of signals that include the preamble 502, and the A burst 510, the B burst 520, the C burst 530, and the D burst 540 as the signals are actually appear on a disk after being written to the disk, in an example embodiment. As shown, the burst signals A, B, C and D do not appear to be neat rectangular bars as depicted in FIG. 2. Rather the A burst 510, the B burst 520, the C burst 530, and the D burst 540 are actually crescent-shaped or moon-shaped after being written into the servo wedge 128 on the disk 120 of the disk drive 100. In addition, the signals making up the preamble 502 also actually appear as a series of crescent shapes. The transitions appear as crescent-shaped when written perpendicularly with respect to the surface of the disk 120. In other words, in disk drives that write transitions to a magnetic layer of the disk 120 using perpendicular or vertical magnetic recording, the transitions appear at the surface as crescent shapes. It should be understood that this is only one example of how transitions appear on the surface of a disk 120. It should be understood that this may also occur when writing transitions that are horizontal with respect to the major surface of the disk 120. It should also be understood that the crescent-shaped transitions shown in FIG. 5 are somewhat exaggerated for the sake of illustration. The transitions also are represented as crescents curved in one direction. It should be noted that the crescents can be curved the other way or that the transitions are not even crescent shaped. The crescents are representative of transitions that are not substantially vertical with respect to a horizontal track. In other words, the crescents merely represent a transition that may include an in phase portion and an out of phase portion.

Now looking more closely at FIG. 5, it can be demonstrated that the crescent shape, or moon shape, of the various signals written can introduce phase errors that depend upon the path which a read head required transducing head 142 will take as it passes over the various burst signals. For example, if the read head passes over the center of track zero as depicted by dotted line 550, the phase of the A burst 510, and the phase of the B burst 520 will be out of phase with respect to the phase of the preamble signals 502. When starting at the left hand side of FIG. 5 and proceeding along path 550 to the right hand side, the preamble signals 502 are all written in phase with the A burst signal or set of signals 510, the B burst signals 520, and the C burst signals 530. The preamble signals 502, the A burst signals 510, the B burst signals 520, and the C burst signals 530 are along the path 550 and will be read by the transducer when the transducer passes over the path. Again, all the signals written are essentially crescent shaped. Therefore, as the head flies over the preamble signal 502, even though the A burst signals 510, and the B burst signals 520 have been actually written in phase, the crescent-shape of the signals are the portion of the A burst and the B burst that is along the path 550. As a result, only the end of the A burst signal, such as end 512 and the end of the B burst signal, such as end 522 will be passed over by the read head portion of the transducing head. The ends will be slightly out of phase with respect to the center of the preamble signal 502. It should also be noted that the path 550 will also pass through or over the center of the crescent shaped signals forming the C burst pattern 530. Therefore, the signals associated with the C burst pattern 530 will always be in phase with the signals, such as signal 502 that forms the preamble portion of the servo wedge.

Thus, even though the A burst signals 510, and the B burst signals 520 are written so that they are in phase with the preamble signals 502, their shape will put them slightly out of phase because the end of the crescent will be what is read by the transducing head 146 as it passes over the center of track zero along path 550. It should also be noted that any of the signals that have the same horizontal position as the preamble signals 502 will always be in phase presuming, of course, that substantially the same geometric shape or crescent shape will be made whenever a signal is written by a particular right head. Thus, for example, along path 550 the C burst signal 530 will always be substantially in phase with the preamble signal 502 provided that the same shape of signal is reproduced consistently by the write head and also provided that the C burst signals 530 was initially written in phase with the preamble 502.

Now looking at path 552, which is along the border or midway between the center lines of track zero and track one, and moving from the left to the right, the curved ends of the preamble signals 502, such as end 503 and end 504, will be read as the preamble signal 502. Since the ends 503, 504 of all the preamble signals, such as signal 502, are read as the preamble signals along path 522, the phase lock loop will also lock slightly out of phase from the center of the crescent shape which represents the original position or desired position of the preamble signals 502. As a result, as the transducing head 146 moves from left to right and passes through the middle of the B burst signals 520, the B burst signals will be slightly out of phase with respect to the tails 503, 504 of the preamble signal 502. As the transducing head 146 proceeds further, it encounters the tails of the C burst signals 530 and the tails of the D burst signals 540. These probably will be substantially in phase provided that these third and fourth bursts 530, 540, respectively, were originally written in phase with the preamble signals such as 502.

When the phase of a burst is effectively shifted such as by the different shapes formed by writing of the various burst signals 510, 520, 530, 540 it can cause errors or difficulties when demodulating of the signals. These difficulties or slight errors induced by the shape of the various signals as written will cause an error in the position error signal. This, in turn, will result in a miscorrection of the position of the transducing head 146 with respect to the center of the track under certain conditions.

Figure 6:
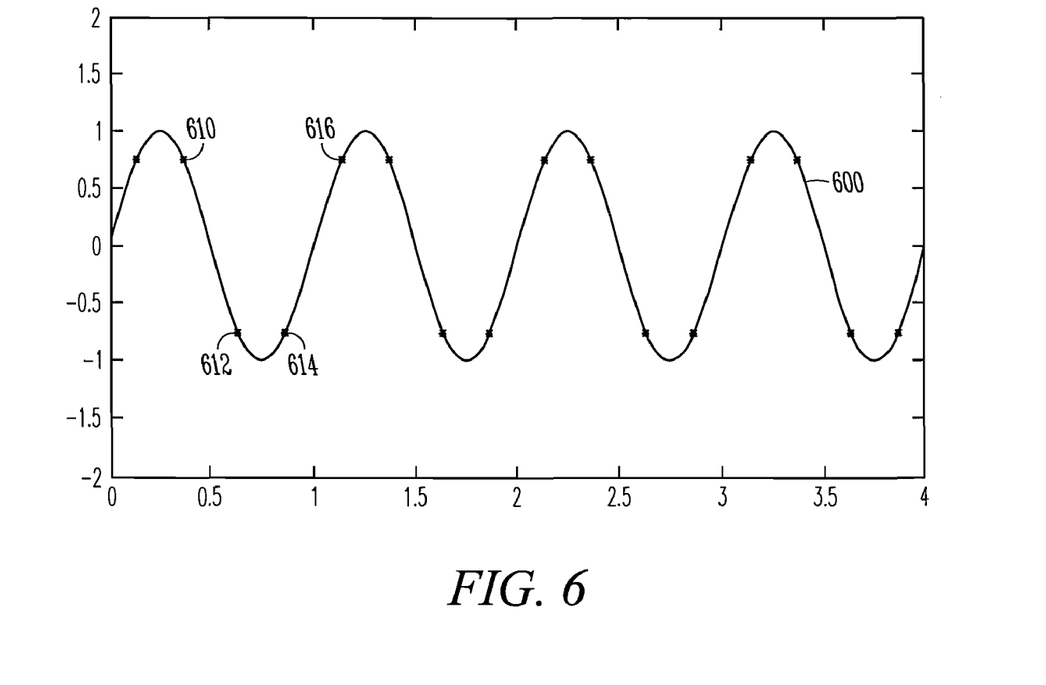
FIG. 6 is a signal sampled with substantially no phase error, according to an example embodiment.
Figure 7:
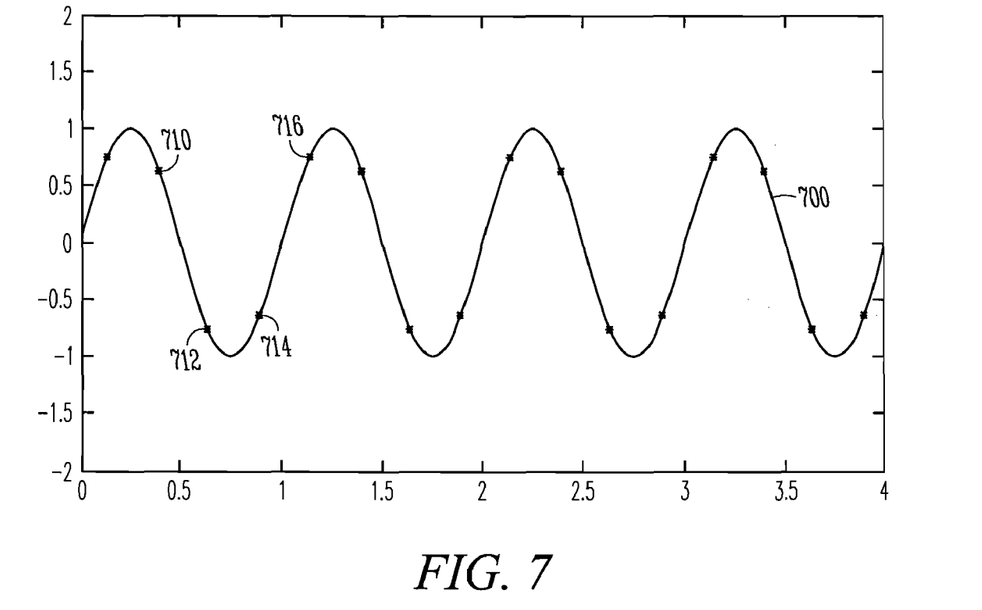
FIG. 7 is a signal sampled with a small phase error, according to an example embodiment.
Figure 8:
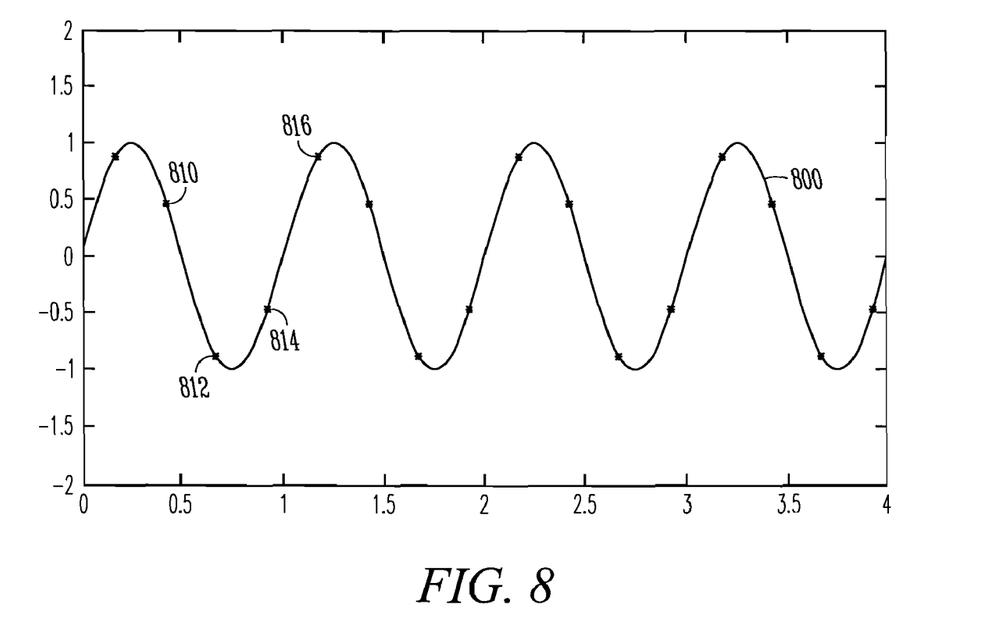
FIG. 8 is a signal sampled with larger phase error than found in FIG. 7, according to an example embodiment.

FIG. 6 is a signal sample of a substantially no phase error according to an example embodiment. FIG. 7 is a signal sample with a small phase error according to another example embodiment. FIG. 8 is a signal sample sampled with a larger phase error than found in FIG. 7 according to yet another example embodiment. Now referring to FIGS. 6, 7, and 8, the ideal sampled signal of FIG. 6 will be compared with the less than ideal conditions induced by various sized phase errors as shown in FIGS. 7 and 8. FIG. 6 shows a signal 600 which is sampled four times every 360° or at every 90°. The first sample will be taken at approximately 45°, the second sample will be taken at approximately 135°, the third sample is taken at approximately 225°, and the last sample is taken at approximately 315°. The end result is that if the bursts A, B, C, and D are in phase, then the signal will be sampled at points 610, 612, 614, and 616. The portion of the sinusoidal signal that is used for the samples 610 and 612 is substantially linear. Similarly, the portion of the sinusoidal signal sampled at points 614 and 616 is also substantially linear. This allows for a substantially coherent written pattern. A coherent burst signal is a signal written with substantially the same phase as the preamble or the exact opposite phase (which means 180 degrees out of phase) with the preamble.

Shifting the phase slightly, as shown in FIG. 7, results in the first sampling point 710 having a slightly higher value and then the second sampling point 712 has a slightly lower value. Similarly the third sampling point 714 has a slightly higher value and the fourth sampling point 716 has a substantially higher value. However, the sample points or the samples fall on the substantially linear portions of the sine waves. As long as the samples remain in the substantially linear region of the sine waves, and both get multiplied and, added, as they normally do during signal processing, the samples approximately cancel. Therefore slight changes in phase do not result in substantial errors in the position errors signal.

FIG. 8 shows a signal sampled with a larger phase error than that found in FIG. 7. Now the sample points 810, 812, 814, and 816 are outside the linear regions of the sine waves. In essence the phase shifting of the signal, combined with the timing of the sampling points staying the same, results in sample points, or at least some of the sample points such as 812 and 816 falling outside the linear regions of the sine wave read from the servo patterns. This larger phase error can produce, or contribute to errors during the signal demodulation process that ultimately produce an errant position error signal.

Figure 9:
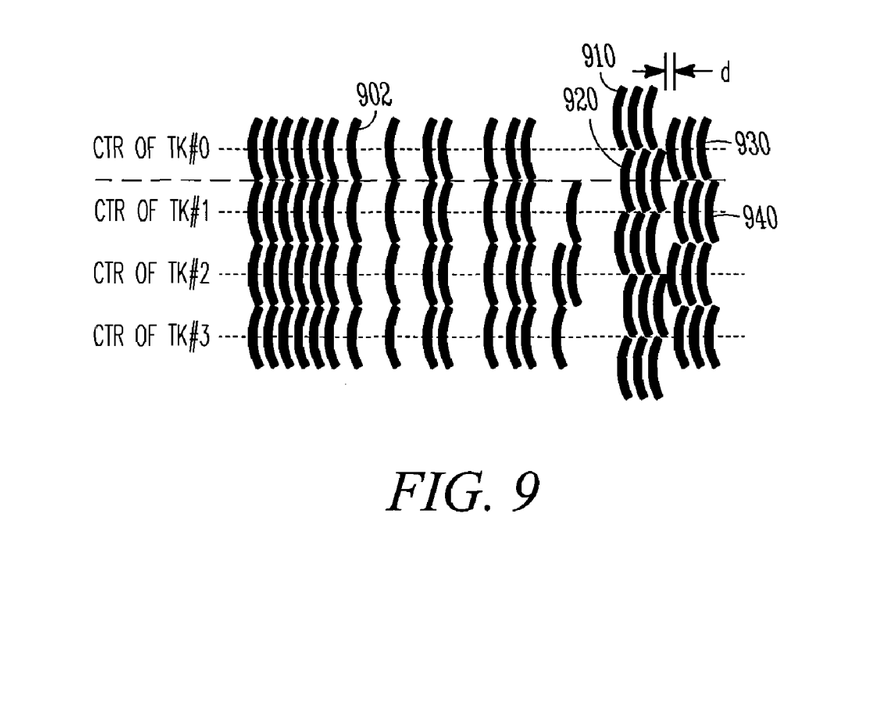
FIG. 9 is a representation of a set of signals that include the preamble, and a shifted A burst, a shifted B burst, the C burst, and the D burst, according to an example embodiment.

FIG. 9 is a representation of a set of signals that include a preamble, and an A burst, the B burst, the C burst, and the D burst where the bursts A and B are phase shifted to account for the shape of the transition as actually written to the disk, according to an example embodiment. It should be noted that knowing that a slight phase change has little or no effect for the PES signal, as depicted by FIG. 7 above, a slight phase change can be accommodated for by writing a null pattern with one of the sets of phase bursts shifted with respect to the preamble and with respect to the other phase burst. In other words, because of the shape of the written signals the A and B bursts are written slightly out of phase with respect to the preamble and the C and D bursts. Writing the A and B bursts slightly out of phase compensates for that phase shift due to the shape of the written signals and the position of the transducing head as it passes over a particular path and lessens or substantially removes errors in the position error signal.

Now turning to FIG. 9, it can be seen that the preamble 902, as well as the A burst 910, the B burst 920, the C burst 930, and the D burst 940 all appear as crescent shapes as written on the surface of the disk 120 (see FIG. 1). The A burst 910 and the B burst 920 have been shifted in phase so that the tails, and all the other portions of the A and B bursts, are now more closely in phase with the center portions of the preamble. Thus, when the head flies through the center of the preamble signals 902, the A and B bursts, 910 and 920 respectively, will now produce signals that are more substantially in phase with the preamble and also in phase with the C servo burst 930 that follows when the transducing head 146 (see FIG. 1) flies over the center of the track. It should be noted that the A and B bursts are phase shifted by a distance d which is depicted in FIG. 9. The distance d is selected so that the phase shift compensates for the shape of the signal as written on the disk when the read head is in a position where it is necessary to have an accurate position error signal. This avoids a miscorrection in the position of the transducing head through the control mechanism show in FIG. 3. It should also be noted that the amount of phase shift introduced by writing the A burst 910 and the B burst 920 out of phase introduces errors when the transducing head 146 (see FIG. 1) is flying on one path and lessens errors when the transducing head 146 (see FIG. 1) is flying along another path. Therefore, the amount of phase shift introduced must provide benefits which outweigh any potential errors introduced by the phase shift.

A media 120 includes a plurality of tracks, a preamble portion 902 including a set of signals, a first servo burst or C burst 930 having a first plurality of signals written substantially in phase with the preamble portion, and a second servo burst or A burst 910 written out of phase with the preamble portion 902 and the first servo burst or C burst 930. The amount of phase shift between the second servo burst or A burst 910 and the preamble portion is selected to compensate for an attribute of the signals associated with the second servo burst or A burst 910, as written to the media 120. In one embodiment, the attribute of the second servo burst or A burst 910 is a shape of the signals as written to the media. In one embodiment, the shape of the signals written to the media is a crescent shape. In still another embodiment, the first servo burst or C burst 930 and the second servo burst or A burst 910 are written in a null burst pattern. The media 120 can also include a third servo burst or B burst 920 which is written substantially 180 degrees out of phase with the second servo burst or A burst 910. In some embodiments, the first servo burst or C burst 930, the second servo burst or A burst 910 and the preamble portion 902 are written with perpendicular transitions.

A disk drive 100 includes a disk, a transducing head 146 to read information from the disk 120, and a read channel 313 to read information from the disk 120 including the information associated with the first servo burst or C burst 930 and the second servo burst or A burst 910. The disk 120 further includes a preamble portion 902 including a set of signals, a first servo burst or C burst 930 having a first plurality of signals written substantially in phase with the preamble portion 902, and a second servo burst or A burst 910 written out of phase with the preamble portion 902 and the first servo burst or C burst 930. The amount of phase shift between the second servo burst or A burst 910 and the preamble portion 902 is selected to compensate for an attribute of the signals associated with the second servo burst or A burst 910 as written to the disk 120 of the disk drive 100. In one embodiment, the attribute of the second servo burst or A burst 910 is a shape of the signals as written to the disk 120 of the disk drive 100. The disk drive 100 can also include a third servo burst or B burst 920 which is written substantially 180 degrees out of phase with the second servo burst or A burst 910. In one embodiment, the first servo burst or C burst 930, the second servo burst or A burst 910 and the preamble portion 902 are written with perpendicular transitions.

Figure 10:
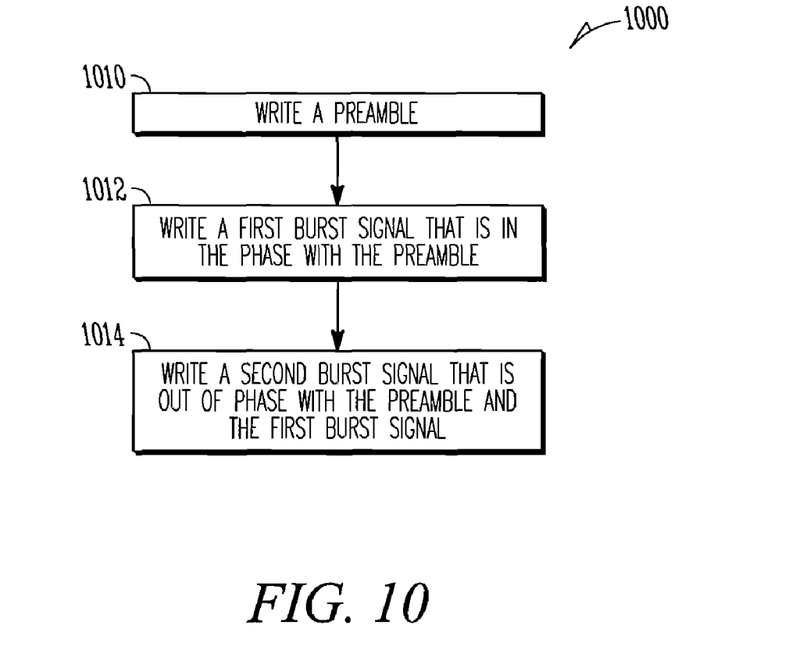
FIG. 10 is a flow diagram of a method, according to an example embodiment.

FIG. 10 is a flow diagram of a method 1000, according to an example embodiment. The method 1000 includes writing a preamble 1010, writing a first burst signal that is in phase with the preamble 1012, and writing a second burst signal that is out of phase with the preamble and the first burst signal 1014. Writing the second burst includes shifting the amount the second burst is out of phase by an amount to reduce incoherence of a sampled signal generated by the second burst.

In another embodiment, the second burst is not shifted on the media but is rather shifted using an instruction set, such as instruction set 2062. In still other embodiments, the instruction set is executed by a machine such as a computer. Now turning to both FIGS. 11 and 12, a computer 2000 and an instruction set, such as instruction set 2062, will be further detailed.

Figure 11:
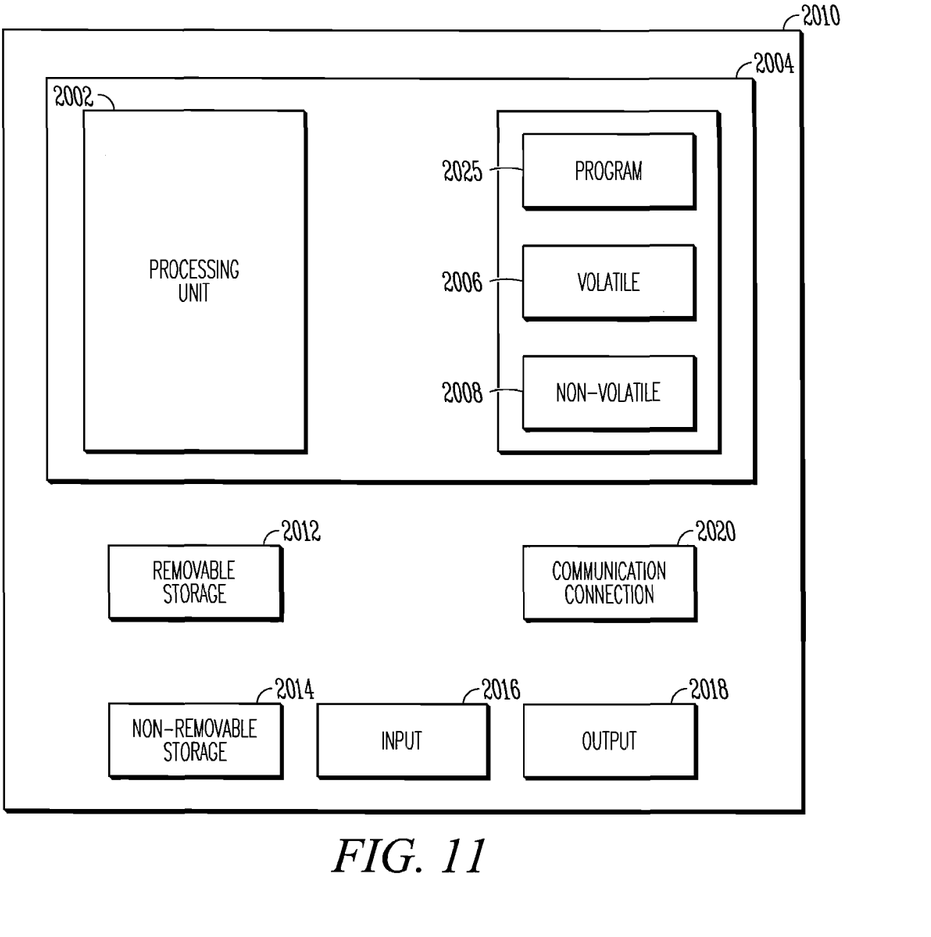
FIG. 11 is a representation of a computing system, according to an example embodiment.

A block diagram of a computer system that executes programming for performing the above algorithm is shown in FIG. 11. A general computing device in the form of a computer 2010, may include a processing unit 2002, memory 2004, removable storage 2012, and non-removable storage 2014. Memory 2004 may include volatile memory 2006 and non volatile memory 2008. Computer 2010 may include any type of information handling system in any type of computing environment that includes any type of computer-readable media, such as volatile memory 2006 and non volatile memory 2008, removable storage 2012 and non-removable storage 2014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 2010 may include or have access to a computing environment that includes input 2016, output 2018, and a communication connection 2020. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. A microprocessor or controller associated with the disk drive 100 (see FIG. 1) is also such a computer system. A set of instructions for shifting phase is generally located in an instruction set associated with the disk drive 100 that is generally termed firmware. The microprocessor or controller associated with a disk drive executes the firmware or computer readable instructions to shift the phase of the servo bursts, in one embodiment.

Computer-readable instructions stored on a machine-readable medium are executable by the processing unit 2002 of the computer 2010. A hard drive, CD-ROM, and RAM are some examples of articles including a machine-readable medium. For example, a computer program 2025 executed to shift the phase of one of the servo bursts so as to compensate for the shape of the signals forming the servo burst. The computer program may also be termed firmware associated with the disk drive 100. In some embodiments, a copy of the computer program 2025 can also be stored on the disk 120 of the disk drive 100.

Figure 12:
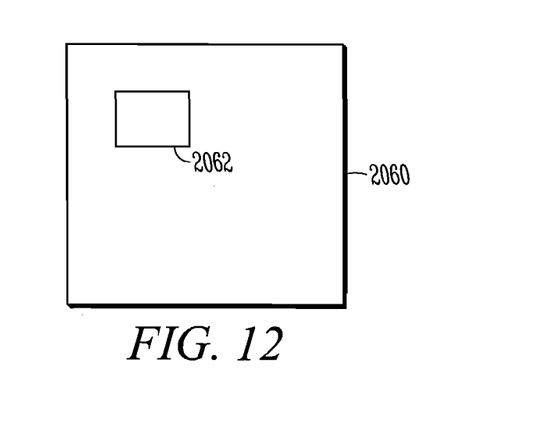
FIG. 12 is schematic of a machine-readable media, according to an example embodiment.

FIG. 12 is a schematic diagram that shows a machine readable medium 2060 and an instruction set 2062 associated with the machine readable medium 2060, according to an example embodiment. The machine-readable medium 2060 provides instructions 2062 that, when executed by a machine, such as a computer, cause the machine to perform operations that include reading information from a magnetized portion of the media that includes a preamble portion including a set of signals, a first servo burst having a first plurality of signals written substantially in phase with the preamble portion, and a second servo burst written substantially in phase with the preamble and the first servo portion. The instructions 2062 further cause the machine to shift the phase of at least a portion of the second servo burst with respect to the preamble. Shifting the phase, in one embodiment, includes shifting the phase of at least a portion of the second servo burst with respect to the preamble by an amount to improve coherence of a sampled read back signal from the second servo burst. In another embodiment, shifting the phase includes shifting the phase of substantially the entire second servo burst with respect to the preamble. Shifting the phase can also include shifting the phase of substantially the entire second servo burst with respect to the preamble by an amount to improve coherence of a sampled read back signal from the second servo burst.

This other embodiment can be implemented in a disk drive having a media written as shown in FIG. 5. Now referring both to FIGS. 1 and 5, the drive 100 includes a disk 120, a transducing head 146 to read information from the disk 120, and a read channel 313 to read information from the disk 120 including the information associated with the first servo burst 530 and the second servo burst 510. The disk 120 further includes a preamble portion 502 including a set of signals, a first servo burst 530 having a first plurality of signals written substantially in phase with the preamble portion 502, and a second servo burst 510 written substantially in phase with the preamble 502. The disk drive 100 also includes a phase shifter 590 to shift the phase of at least a portion of the second servo burst 510 with respect to the preamble 502. In one embodiment, the phase shifter 590 is associated with the read channel 313 of the disk drive 100. The phase shifter 590 shifts the phase of substantially the entire second servo burst 510. The phase shifter 590 includes a filter for filtering the second servo burst to effectively shift the phase of the second servo burst 510. In one embodiment, the preamble 502, the first servo burst 530 and the second servo burst 510 are written with transitions substantially perpendicular to a major surface of the disk 120. In still another embodiment, the phase shifter 590 operates on an instruction set 2062 to effectively shift the phase of the second servo burst 510.

Figure 13:
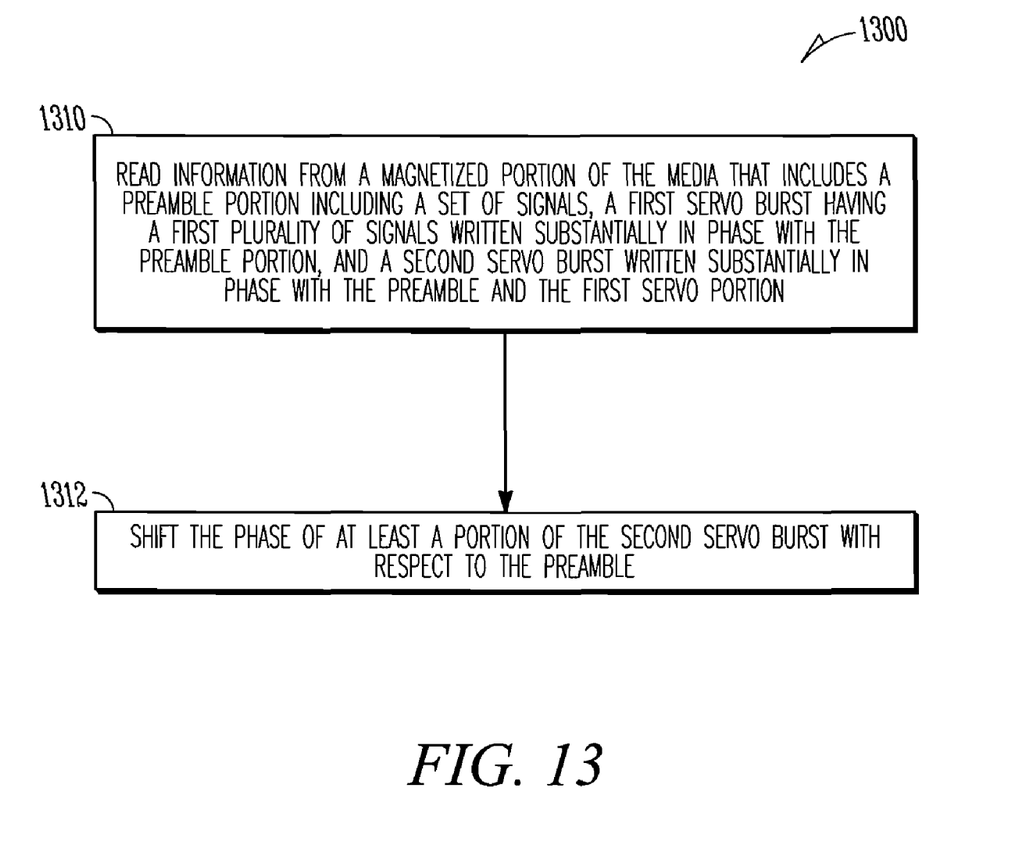
FIG. 13 is a flow diagram of a method for shifting the phase of at least a portion of one of the servo bursts, according to an example embodiment.

FIG. 13 is a flow chart showing a method 1300 for shifting the phase of at least a portion of one of the servo bursts. The method 1300 includes reading information from a magnetized portion of the media that includes a preamble portion including a set of signals, a first servo burst having a first plurality of signals written substantially in phase with the preamble portion, and a second servo burst written substantially in phase with the preamble and the first servo portion 1310. The method 1300 also includes shifting the phase of at least a portion of the second servo burst with respect to the preamble 1312. Shifting the phase, in one embodiment, includes shifting the phase of at least a portion of the second servo burst with respect to the preamble by an amount to improve coherence of a sampled read back signal from the second servo burst. In another embodiment, shifting the phase includes shifting the phase of substantially the entire second servo burst with respect to the preamble. Shifting the phase can also include shifting the phase of substantially the entire second servo burst with respect to the preamble by an amount to improve coherence of a sampled read back signal from the second servo burst. The phase can be shifted by way of filters or tap weights in various filters. In another embodiment that samples, a discrete fourier transform includes a real part and an imaginary part. A band limited sample signal can be effectively phase shifted using a particular linear combination of the real part and the imaginary part of the discrete fourier transform to yield the real and imaginary parts of a phase shifted sampled signal.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A media comprising:
   a plurality of tracks;
   a preamble portion including a set of signals;
   a first servo burst having a first plurality of signals written substantially in phase with the preamble portion; and
   a second servo burst written out of phase with the preamble portion and the first servo burst, wherein an amount of phase shift between the second servo burst and the preamble portion is selected to compensate for a shape of signals associated with the second servo burst as written to the media.

2. The media of claim 1 wherein the shape of the signals associated with the second servo burst is a crescent shape.

3. The media of claim 1 wherein first servo burst and the second servo burst are written in a null burst pattern.

4. The media of claim 1 further comprising a third servo burst which is written substantially 180 degrees out of phase with the second servo burst.

5. The media of claim 1 wherein the first servo burst, the second servo burst and the preamble portion are written with perpendicular transitions.

6. A disk drive comprising:
   a disk, the disk further including:
      a preamble portion including a set of signals;
      a first servo burst having a first plurality of signals written substantially in phase with the preamble portion; and
      a second servo burst written out of phase with the preamble portion and the first servo burst, wherein an amount of phase shift between the second servo burst and the preamble portion is selected to compensate for a shape of signals associated with the second servo burst as written to the disk;
   a transuding head to read information from the disk; and
   a read channel to read information from the disk including information associated with the first servo burst and the second servo burst.

7. The disk drive of claim 6 further comprising a third servo burst which is written substantially 180 degrees out of phase with the second servo burst.

8. The disk drive of claim 6 wherein the first servo burst, the second servo burst and the preamble portion are written with perpendicular transitions.

* * * * *